June 20, 1967 P. M. CUNNINGHAM 3,327,219

DETECTOR CIRCUITS FOR DIRECTLY STROBING RADIO FREQUENCY SIGNALS

Filed Aug. 26, 1963 3 Sheets-Sheet 1

INVENTOR.

Paul M. Cunningham

BY Moody and Antrim

Agents

INVENTOR.
Paul M. Cunningham
BY Moody and Antrim
Agents

TUNING OSCILLOGRAM

ENVELOPE STROBING PULSES

INVENTOR.
Paul M. Cunningham
BY Moody and Antrim
Agents

United States Patent Office 3,327,219

Patented June 20, 1967

3,327,219

DETECTOR CIRCUITS FOR DIRECTLY STROBING RADIO FREQUENCY SIGNALS

Paul M. Cunningham, Richardson, Tex., assignor to Collins Radio Company, Cedar Rapids, Iowa, a corporation of Iowa Filed Aug. 26, 1963, Ser. No. 304,443

3 Claims. (Cl. 325—325)

This invention pertains to detectors of phase coded pulse signals and particularly to synchronous detectors that sample the radio-frequency carrier signal of the pulses during intervals that are short compared with the period of a cycle of the carrier. Through use of the detectors of this invention, the reference timing points of the pulses are determined by sampling (strobing) directly successive cycles of the carrier. Fundamentally, the detectors are used to determine the relation between the phase and increments in amplitude of pulses of radio-frequency signals.

Prior long-range navigation receivers have customarily used synchronous detectors and strobing circuits in which the radio-frequency carrier signal is demodulated to provide pulse envelopes before the pulses are sampled. In order to determine the point at which the leading edge of each pulse is to be sampled, the pulse envelope of one detector circuit is delayed and combined with the pulse envelope of another detector circuit. A point at which the phase reverses in the combined output determines when the envelopes at the outputs of all the detectors are to be strobed or sampled.

The present system does not include the prior detector circuits for developing the envelope of the incoming pulses nor the combining circuits for determining strobing time. The detector circuits and strobing circuits together are about as extensive as the former strobing circuits alone. In addition to eliminating many circuits, the strobing circuits that are required are simplified. The points of the pulse waveform between which the lengths of intervals are measured precisely, are more definitely located on the pulses than those in prior systems.

In the systems of prior design, error can readily arise in determining the exact point at which the pulse envelope is to be strobed and relating the point on the pulse envelope to a selected point on the radio-frequency carrier. The output circuitry of the detector can readily cause error. Since inherently the unavoidable stray distributed shunt capacitance of the output circuit of the detector causes noticeable integration of the radio-frequency carrier, the rate of rise of the derived envelope does not conform exactly with the rate of rise of a constructive envelope that is drawn through the peaks of the incoming carrier. Also, the envelopes of the pulses that are derived from different transmitting stations may have slightly differently shaped leading edges when they are received at distant stations because of dispersion in the transmission medium.

The present system compensates for error caused by actual change in the envelope as it is propagated. The error caused by change of the envelope in the detector system is eliminated. The point at which the radio-frequency pulses are strobed is definite because the phase of the strobing is determined by positioning a selected crossover on each of the pulses. Since the circuits that generate the required short strobing pulses have a short duty cycle, the components required in the circuit are less expensive than those that are required in prior receivers to re-create pulses that have the same phase and duration as long or longer than those of the received pulses.

Much of the interference in long-range navigation receivers is generated within the receiver itself. By using strobing pulses of short duration and thereby eliminating the longer re-created pulses, interference that results from leakage of signals from the pulse forming circuits through the input of the receiver is eliminated. The transmission times of the interfering pulses through the input of the receiver are greater than the durations of the pulses for enabling the diode switching strobe detectors. Therefore, the diode switches are disabled when signal distorted by leakage of the pulse arrives at their inputs. The transients created by each pulse have decayed before a succeeding pulse arrives at the input of the switching detector. Direct strobing of the signal eliminates the ambiguity as to the point at which the pulse is being strobed for the system readily adapts itself to the connection of an oscilloscope for identifying clearly the portion of the radio-frequency carrier that is being strobed.

An object of this invention is to simplify the circuitry of long-range navigation receivers and timing receivers by directly strobing the radio-frequency carrier of incoming repetitive pulses.

Another object is to provide display means for showing directly the point at which the radio-frequency carrier of each pulse is being strobed.

Still another object is the elimination of the ambiguity in timing that results from strobing the pulses at different points because of the change in shape of the pulses either during propagation or during detection at the receiving station.

In addition to eliminating circuitry, a feature of the invention is that the circuits for creating strobing pulses have a shorter duty cycle, and, with the same components, have a greater wider dynamic range than the circuits used in previous receivers for re-creating the local signal for mixing with identical incoming signal.

Another feature is the reduction of interference caused by leakage that results from transients of the strobing circuit.

These objects and the following description may be better understood with reference to the accompanying drawings in which.

Figure 1:
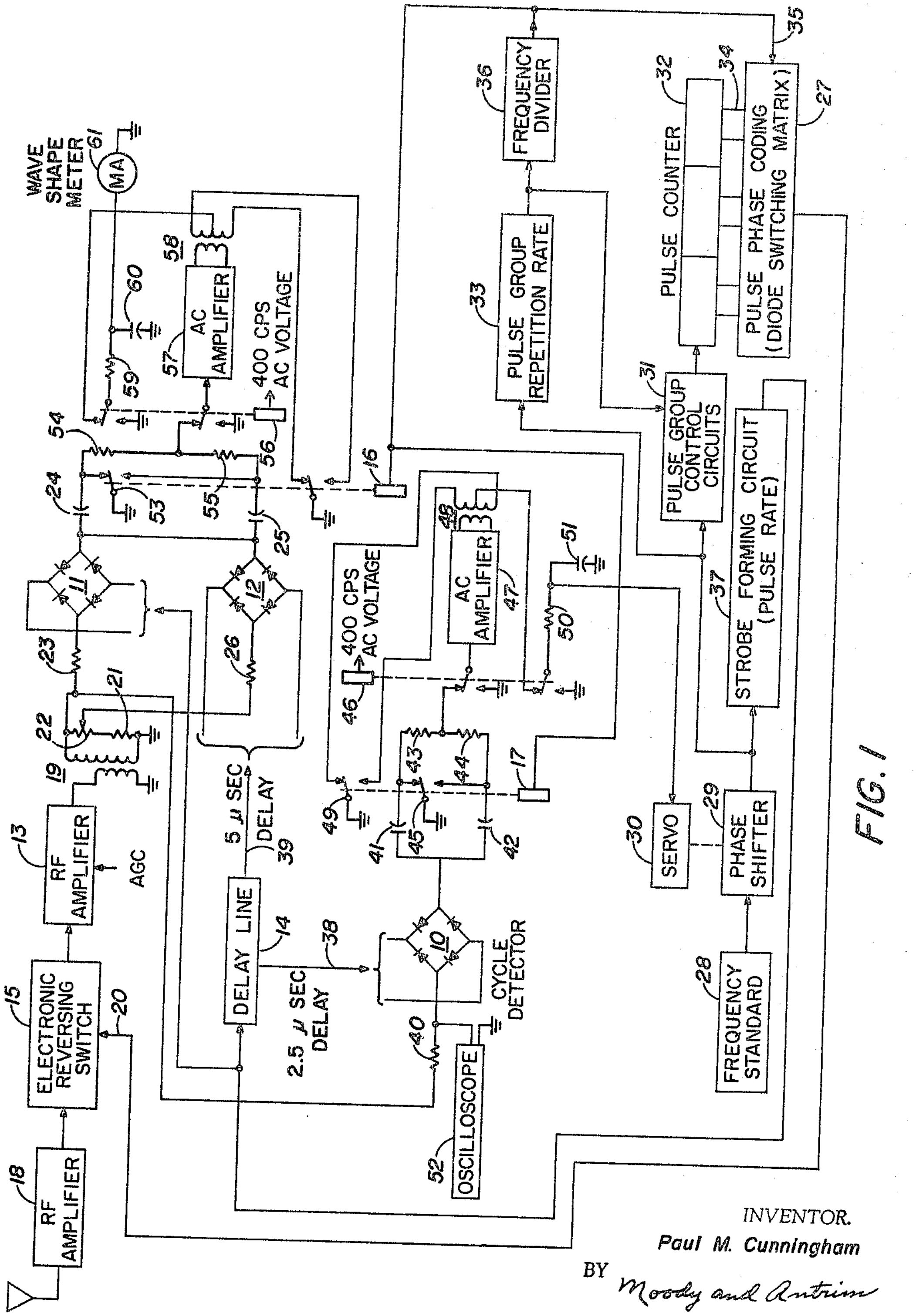
FIG. 1 is a schematic diagram of the synchronous detectors and the strobing circuits of this invention shown connected within a skeleton block diagram of a single channel timing receiver.

Briefly, three synchronous detectors 10, 11, and 12 for strobing directly radio-frequency carrier signals are shown connected in the skeleton block diagram of a single channel loran-C timing system of FIG. 1. A fourth detector that is required to furnish the automatic-gain-control voltages for the radio-frequency amplifier 13 is not shown. A long-range navigation receiver (loran-C) that has multiple detector channels connected to the output of the radio-frequency amplifiers of FIG. 1, may readily utilize synchronous detectors of the type shown for the single channel.

Each of the three synchronous detectors of FIG. 1 are enabled by the application of a repetitive rectangular strobing signal for intervals that are short compared with the period of the carrier of the received signal. Synchronized strobing signal is applied to the input of the delay line 14 and delayed one-fourth period, in this instance 2.5 microseconds, for application to the strobe input of the diode bridge detector 10. A typical duration of each of the strobes and the timing of the strobes relative to the carrier of the incoming pulse is shown in the tuning oscillogram of FIG. 4. When each of the strobes is centered on a selected crossover of each repetitive pulse of the carrier signal, in this example the sixth crossover, the output of the cycle detector 10 is zero. When the strobe timing departs from the centered position, voltage is developed to operate the servo that is connected to the output of the detector, thereby to operate as a phase detector for correcting the phase of the strobe so that it is again centered at the crossover.

The outputs of the envelope detectors 11 and 12 are combined to indicate a ratio of increments in amplitude of selected successive one-half cycles of the radio-frequency carrier within the pulse that is being sampled to the overall amplitude of the sampled point. Although the envelope of the received pulse is not actually produced, the reading that is obtained from the combined outputs of the detectors is a function of the slope and also the amplitude of a constructive envelope at a selected point on its leading edge. Since the measured ratio of the difference in amplitude to the overall amplitude at the point of measurement constantly varies at different points because of the shape of the first part of the pulse the reading of a predetermined ratio of the increment to the overall amplitude establishes a definite point at which the pulse is sampled with reference to the start of the pulse.

Figures 5, 6:
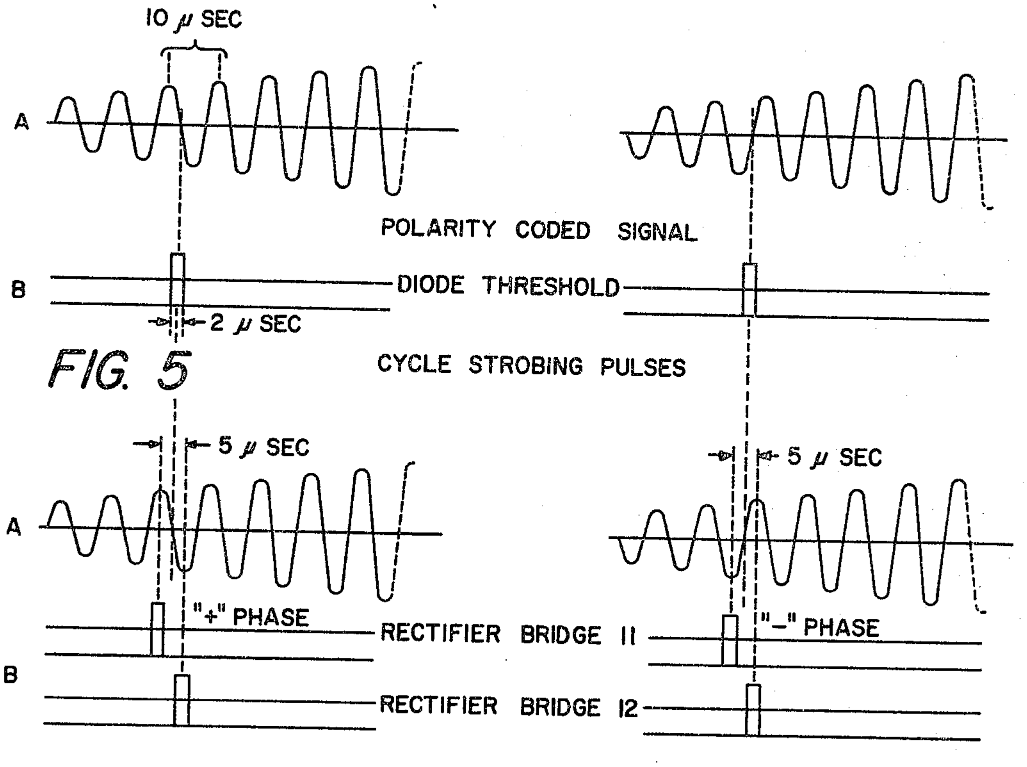
FIGS. 5 and 6 are waveform diagrams to show the relative timing of the strobing pulses and the incoming signals that are applied to the detectors of FIG. 1.

The sequence of the times of application of the strobing pulses is shown in FIGS. 5 and 6. The cycle strobe is shown centered on the sixth crossover of the incoming pulse of FIG. 5A. As shown in FIG. 6, the strobing pulse is applied to the diode bridge 11 of the envelope detector earlier by one-fourth period, 2.5 microseconds, than the application of the strobing pulse to the cycle detector 10. This strobing pulse is derived directly from the output of the strobe forming circuit. The output of the strobe forming circuit is also applied to the input of the delay line 14. The delay line 14 delays the strobe pulse 5 microseconds for application to the rectifier bridge 12 of the envelope detector. As the strobing voltages occur at these times relative to the start of a received pulse, the diode switching bridge 11 samples the crest of the one-half cycle that occurs before the sixth crossover, and the diode switching bridge 12 samples the crest of the one-half cycle that occurs after the sixth crossover. The relative values of the sampled voltages are compared as described in detail below, to provide an indication of the shape and timing point of the received pulse.

The electronic reversing switch 15, connected in the radio-frequency amplifier circuit, and the relay-type choppers 16 and 17 are operated in synchronism. The reversing switch 15 periodically reverses the phase of the received pulses as described in detail below. The choppers that have contacts connected to capacitors that are supplied voltages from the outputs of the diode bridges of the detectors connect output circuits to the capacitors in synchronism with reversals of the incoming signal so that the voltages resulting from the incoming signals are added, but the offset voltages that result primarily from characteristic differences in the diode switches are canceled.

In detail, the radio-frequency receiving system for applying incoming pulses to the cycle detector and the envelope detector comprise a radio-frequency amplifier 18, an electronic reversing switch 15, and a radio-frequency amplifier 13 connected in cascade. The amplifiers are tuned to the frequency of the carrier of the pulses. The frequencies that are commonly used are near 100 kilocycles. The electronic reversing switch 15 is the type comprising a center tapped inductor connected to diode switching circuits for inverting the phase of the incoming signal in response to application of control voltage to its input control circuit 20. The gain of the radio-frequency amplifier 13 is controlled by an automatic-gain-control circuit (not shown) that utilizes a synchronous detector similar to those shown. The automatic-gain-control detector also responds to application of strobing voltages to sample directly the radio-frequency carrier. However, the output circuit of the detector of the gain control circuit differs so that the output is proportional to the amplitude of the incoming signal rather than being primarily a function of phase.

The output circuit of the radio-frequency amplifier 13 includes the primary winding of a radio-frequency transformer 19. A fixed resistor 21 and a potentiometer 22 are connected in series across the secondary winding. As described below, the arm of potentiometer 22 is adjusted until the outputs of diode switching bridges 11 and 12 of the envelope detector are equal when a predetermined sampling point on the carrier of the incoming pulse has been selected. One terminal of the secondary winding of the transformer 19 is connected to ground and the other terminal to which the potentiometer 22 is connected, is connected through the series resistor 23 to a terminal of a conventional diode switching bridge circuit 11. The opposite diagonal terminal of the diode bridge 11 is connected to one terminal of each of the storage capacitors 24 and 25. Whereas the entire voltage that is developed across the secondary winding is applied to the bridge 11, the voltage applied to the bridge 12 from the secondary winding of transformer 19 is decreased by an amount equal to the difference in amplitude between selected successive half-cycles of the carrier. The ratio of the voltages that are applied to the diode bridges 11 and 12 is determined by the setting of the arm of the potentiometer 22 according to the difference in amplitude of the selected half-cycles. The arm of the potentiometer is connected through series resistor 26 to one terminal of the diode bridge 12. The opposite diagonal terminal of the bridge is connected to the same terminals of capacitors 24 and 25 to which the diode bridge 11 is connected. The terminals of the other diagonal of each of the diode bridges 11 and 12 are connected to the strobe forming circuits as described below. The interval between the strobes of the two diode bridges is equal to one-half of the period of the carrier of the pulses.

An example of a code of an incoming signal is shown in FIG. 2A. Each vertical line, or pip, above the horizontal reference line represents a "+" pulse, whereas each of the pips below the horizontal line represents a "−" pulse. The "+" pulse and "−" pulses are distinguished in the usual way for loran-C navigation systems only in that the carrier signals differ in phase by 180 degrees at the start of the respective pulses. For example, the left waveform in FIG. 5A may correspond to a "+" pulse while the right waveform that has a starting phase that differs by 180 degrees is a "−" pulse. The repetitive pulses that are transmitted in timing systems not only have very accurate spacing between the pulses, but also have very accurately controlled wave shape at the start of each pulse. The function of the electronic reversing switch 15 may be easier understood by considering that it is replaced by two electronic reversing switches in series, each having an input control circuit to which voltages of the proper polarity are applied to convert the code of FIG. 2A to the code of FIG. 2B and then to the code of FIG. 2C respectively. If the electronic switch to which the code is first applied has applied to its control circuit a control voltage that changes in polarity whenever the polarity of phase of the incoming pulse changes, the code of FIG. 2A will be converted to the decoded signal of FIG. 2B that shows all pulses of the same polarity. The decoded signal is then applied to the input of the second electronic reversing switch. The control voltages that are applied to the control circuits of this switch are reversed periodically. The periods between the reversals of the control voltage may correspond to the time required for receiving a certain number of groups of incoming pulses. For example, in FIG. 2C two groups of "+" pulses are followed by two groups of "—" pulses.

Figure 2:
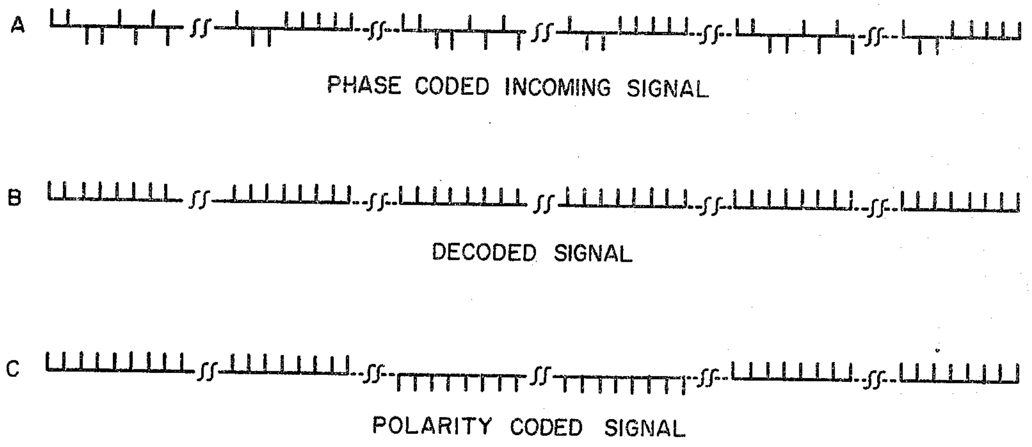
FIGS. 2 and 3 are diagrams of pulse coding for showing the transformation of incoming coded signals into balanced coded signals for application to the detectors of FIG. 1.
Figure 3:
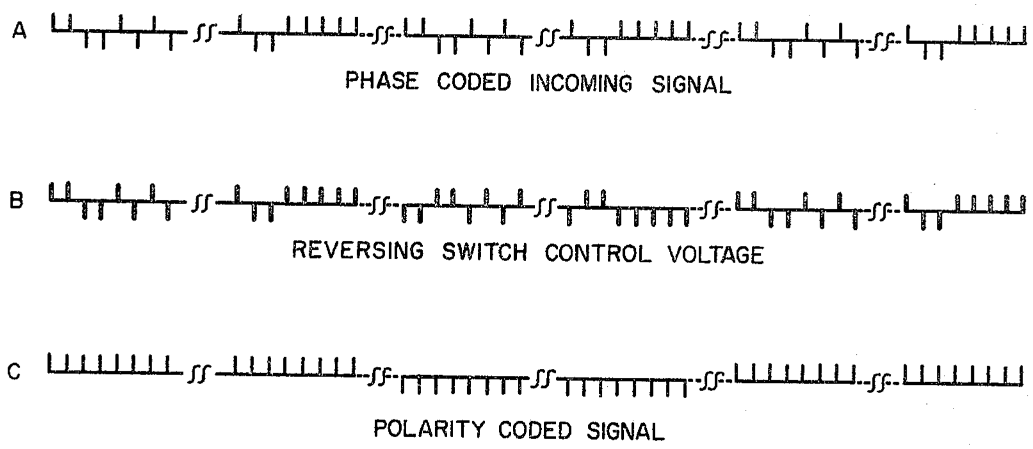

In order to convert the incoming code as shown in FIGS. 2 and 3 by the use of the single electronic reversing switch 15, control voltages that have the same spacings as the incoming code and also having polarities that are determined by both the polarities or phase of the incoming code and the polarities of the corresponding polarity coded signal of FIG. 3C, are developed for application to the reversing switch. The voltages of the first two groups of pulses that are shown in FIG. 3B have the same polarities as corresponding pulses of the incoming signal as shown in FIG. 3A. At the output of the electronic reversing switch 15 all pulses of the first two groups are "+" as shown in FIG. 3C. During reception of the successive two groups of incoming pulses, the polarities of all the switching pulses of FIG. 3B are opposite to the polarities of the corresponding incoming pulses so that the polarities of the pulses of these two groups are "—" as shown for the two center groups of FIG. 3C. As this pattern of the coding of the control voltages for the reversing switch 15 is continued, the polarities of the signal at the output of the electronic reversing switch 15 are reversed periodically so that distortion in amplitude and offset voltage developed in the detectors caused by nonlinearity of circuits subsequent to the reversing switch are decreased or canceled so that the outputs of the amplifier and detector circuits are averaged to provide symmetrical output signal for both "+" and "—" signals.

The voltages for operating the electronic reversing switch 15 are derived from the pulse phase coding or diode switching matrix 27. The switching matrix is responsive to input voltages corresponding to the phase of each pulse of the incoming signal and also to periodic reversing voltages to supply the voltages according to FIG. 3B. The timing for the control voltages is derived from the frequency standard 28. The voltage output of the frequency standard 28 is connected through the phase shifter 29 to the input of code forming circuits. The position of the phase shifter for determining the exact phase of the signal that is applied to the code forming circuits is controlled by the operation of the servo system 30 as described below. The output of the phase shifter 29 is connected through pulse group control circuits 31 to the input of a pulse counter 32. The circuits that are represented by the pulse group control circuits 31 include the necessary frequency dividers and gates to control the rate of operation of the pulse counter 32, and to control the timing of the periods of counting that correspond to pulse groups.

The pulse counter 32 is conventionally a series of bistable flip-flops. Its operation is initiated by the pulse group control circuits 31, by coincident circuits that are not shown, and by operation of the pulse group repetition rate circuits 33. Operation of the pulse counter 32 provides voltages on its output conductors 34 at intervals that correspond to the intervals of the pulses within the groups of the incoming signal. The output conductors 34 are connected to control circuits of the pulse phase coding network 27. In addition to the voltages that are applied to the control conductors 34, periodic control voltage is applied to conductor 35 for reversing the phase of the signal that is applied to the detectors as described above so that the pulses are equally divided between "+" and "—" phases. In the usual timing receiver the periodic reversals may be obtained merely by adding a frequency divider to the output of the circuits that determine the pulse group repetition rate. The input of the pulse group repetition rate circuits 33 is connected to receive the signal that is derived from the output of the phase shifter 29. The output of the pulse group repetition rate circuits 33 is connected to the pulse control groups 31 for controlling the operation of the pulse counter and is connected to the input of the frequency divider 36. If the frequency divider 36 divides by two, for example, the polarity of the pulses of the groups is reversed repeatedly after the reception of two adjacent groups as shown in FIG. 3C.

The output of the frequency standard 28, that is applied through the phase shifter 29, is also applied to the input of the strobe forming circuit 37 to provide flat top strobing pulses for application to the envelope detector and to the cycle detector. The connections that are required between the pulse group repetition rate circuits and the strobe forming circuits 37 to provide coincidence with incoming pulses, are not shown in this skeleton block diagram. The strobe forming circuits include frequency dividers that divide the output of the frequency standard 28 until its rate corresponds to the pulse rate. The signal at the pulse rate is applied to delay circuits and blocking oscillators within the strobe forming circuit 37 to develop the strobing pulses that have steep edges and relatively flat tops. Because of the short duration of pulses, the power rating of component parts may be lower than that of parts used in circuits in which the entire signal pulse is re-created for application to the detectors. The pulse group control circuits control the strobe forming circuit so that the strobing pulses are developed only during the periods when groups of incoming pulses are being received. The operation of the delay circuits within the strobe forming circuit 37 and of the phase shifter 29 provide the timing of the strobing pulses relative to the incoming pulses so that the output of the pulse forming circuit corresponds to the timing shown in FIG. 6 for the rectifier bridge 11.

The output of the strobe forming circuit is connected to the strobing input circuit of detector 11 and also to the input of the delay line 14. The output 38 of the delay line 14 is connected to the strobing input of the diode bridge 10 of the cycle detector, and the output 39 of the delay line is connected to the strobing input of the diode bridge 12 of the envelope detector. The strobing pulses are delayed by the delay line one-fourth of the period of the incoming carrier for application to the strobing input of the cycle detector 10, and one-half of the period of the incoming carrier for application to the diode bridge 12. The delay line 14, therefore, determines that strobing pulses for sampling an incoming pulse will be applied sequentially to diode bridges 11, 10, and 12 at one-fourth cycle intervals.

The cycle detector is responsive to the application of the incoming pulses and respective strobing pulses to develop voltage for operation of the servo system that adjusts the phase shifter 29. At the output of the radio-frequency amplifier circuits 13, the secondary winding of the transformer 19 is connected through resistor 40 to one terminal of the diode bridge 10 of the cycle detector. The opposite diagonal output terminal is connected to a plate of each of the charging capacitors 41 and 42. The other terminal of each of the capacitors 41 and 42 is connected to a contact of chopper 17. A resistive output circuit comprising resistors 43 and 44 is connected between the latter terminals of the capacitors 41 and 42. The junctions of the resistors 43 and 44 are connected to the input of the servo amplifier circuit so that one-half of the sum of the voltages accumulated on capacitors 41 and 42 is applied to the amplifier. Resistors 43 and 44 have such high value that the capacitor 41 or the capacitor 42 that is momentarily disconnected from ground by operation of the armature 45 of the chopper 17 is discharged only a small amount before it is again connected to receive a charge from the detector. The armature 45 of the chopper 17 operates to connect the capacitors 41 and 42 alternately to the common ground. The winding of chopper 17 is connected to the output of the frequency divider 36, and the chopper operates at that rate at which polarities of re-coded signal are reversed as shown in FIG. 3C. For example at one instant, the chopper might be phased so that during application of positive pulses as shown in FIG. 3C to the input of the diode bridge 10, one plate of the capacitor 41 is connected directly to ground, and the other plate of the capacitor 41 that is connected directly to the diode bridge 10 is charged positively with respect to ground. During this interval, the charge that has been previously stored on the other capacitor 42 is merely retained.

At a later instant while the chopper 17 is operated so that the armature 45 is in the position for connecting capacitor 42 directly to ground, the output of bridge 10 is reversed in polarity because of the operation of the electronic reversing switch 15. The plate of capacitor 42 that is connected to the output of the diode bridge 10, therefore, becomes negative. Through the operation of chopper 17 the polarity of the voltages that are applied to each one of the capacitors 41 and 42 remains the same for each one because the ground connection is transferred to different points in the bridge capacitor network during each change of polarity of the signal that is applied to the detector. Any offset voltage that results from dissimilarities of circuit components tends to charge the capacitors so that they have like polarities with reference to ground. The offset bias is canceled in the series connection for applying voltage to the input of the succeeding servo amplifier.

The cycle detector output at the junction of the resistors 43 and 44 is connected through contacts of the chopper 46 to the alternating-current amplifier 47. The chopper 46 is driven at any convenient arbitrary frequency for which the amplifier can be readily designed to operate efficiently. For example, the winding of chopper 46 may be connected to a convenient 400 cycle-per-second source of alternating current. The input impedance of the amplifier 47 is high enough to prevent appreciable discharge of capacitors 41 and 42. The signal voltage that has been chopped at 400 cycles per second is amplified in the amplifier 47 for application to the output transformer 48. The outside terminals of the center-tapped secondary winding of the transformer 48 are connected to the separate contacts of the chopper 17 that are alternately engaged by armature 49. The armature 49 is connected to ground so that the outside terminals of the secondary winding are alternately grounded at the frequency at which the electronic reversing switch 15 is effective in reversing the polarity of the pulses that are applied to the input of the cycle detector. As previously described, the armature 45 of the chopper 17 is effective to maintain the same polarity on each of the capacitors 41 and 42 regardless of whether "+" or "−" pulses are applied to the input of the cycle detector. The voltage that is chopped for application to the input of the servo amplifier is, therefore, always of the same polarity regardless of the direction of departure in phase of the strobing pulse relative to a chosen crossover of the incoming pulses. The operation of armature 49 restores the change in polarity so that it corresponds to the direction of departure of phase between the strobing signal and the incoming signal before application of the amplified voltage to the motor of the servo 30. The center terminal of the secondary winding of the transformer 48 is connected through contacts of chopper 46 and the filter comprising resistor 50 and capacitor 51 to the input of the servo 30. These contacts of chopper 46 function in the conventional manner to rectify synchronously the output voltage of the amplifier to remove the frequency of the chopper as applied to the input of the amplifier.

Figure 4:
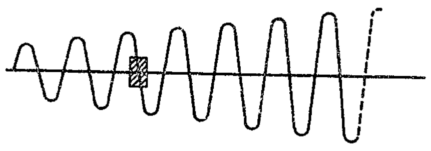
FIG. 4 is a tuning oscillogram to show the position of a strobing pulse on the carrier of an incoming signal as observed on an oscilloscope connected to a cycle detector of this invention.

A tuning oscillogram may be observed on the oscilloscope 52. One of the vertical plates of the oscilloscope is connected to the junction of the series resistor 40 and the input of the diode bridge 10. The other vertical plate is connected to ground. Between intervals of application of the strobing voltage for enabling the cycle detector, the resistance of the diode bridge 10 to the signal is very high, and essentially the entire signal voltage is applied to the oscilloscope so that the waveform of the incoming signal, as shown in FIG. 4, may be observed. When the timing of the strobing voltage that is applied to the diode bridge 10 is such that it occurs at the sixth crossover of the incoming pulse, a departure from the sine waveform is shown on the sixth crossover. When the strobing voltage is applied, the resistance from the oscilloscope connection through the diode bridge 10 to the capacitors 41 and 42 is very low. During the strobing interval, the voltage that is shown on the oscilloscope is the relatively constant voltage corresponding to the charge on either capacitor 41 or 42 as determined by the position of the armature 45. Usually, small transient voltages are present and the strobing interval appears as a small rectangular figure superimposed upon the building-up waveform of the pulse that is being observed. As described subsequently, the receiving system is tuned, or slewed, until the rectangular image that corresponds to the timing of the strobing voltage is centered on the desired crossover.

The operation of the cycle detector and the servo 30 for correcting the phase of the strobing voltage may be understood more readily with reference to the waveforms of FIG. 5. Both the "+" pulse at the left of FIG. 5A and the "−" pulse at the right of FIG. 5A are shown sampled at the sixth crossover by the strobing pulses of FIG. 5B. The width of the strobing pulses for carriers having a cycle period of 10 microseconds should be less than 2.5 microseconds. When the strobing pulses are centered on the crossovers, the average voltage derived from the output of the diode bridge 10 of the cycle detector is zero. Let it be assumed that the phase of the strobing pulses is such that they occur slightly before the sixth crossover points of the pulses of both "+" and the succeeding "−" groups. The square waves for indicating the strobing pulses of FIG. 5B would then be positioned slightly left of the positions that are shown. Then with reference to the left waveform of FIG. 5A, the output of the diode bridge 10 is positive and during a succeeding minus pulse, as shown in the right waveform, the output of the diode bridge 10 is negative. Because of the change in position of the armature 45 in the output of the diode bridge at the instant that the phase of the pulses is reversed by the electronic reversing switch 15, one capacitor, for example capacitor 41, always receives the positive charge while the other capacitor 42 receives the negative charge. The voltages on the capacitors 41 and 42 are obviously a function of the amount of departure in phase. Obviously, when the strobing pulses occur slightly after the sixth crossover, the voltages on the capacitors 41 and 42 are reversed in polarity. This reversal in polarity is carried through the amplifier to the servo 30 and determines the direction of operation of the servo motor.

The change in voltage at the output of the diode bridge 10 with change in departure in phase between the strobing pulses and the pulses that are being sampled must be distinguished from changes in voltages caused by operation of the electronic reversing switch 15. When the electronic reversing switch 15 operates, the phase of the carrier of the incoming pulses is reversed and the voltage at the output of the diode bridge 10 is reversed. The result would be as if the left and right hand waveforms of FIG. 5A were interchanged. However, the voltage that is applied to the input of the servo 30 is not reversed because of the operation of armature 45 to prevent reversal of the charge on the capacitors 41 and 42 and the synchronous operation of armature 49 for determining the polarity applied to the servo. When the phase of the strobing pulse has departed in a particular direction from the phase of the carrier of the incoming signal, the voltage that is applied to the input of the servo 30 has the proper polarity to operate the phase shifter in that direction required for correcting the phase of the strobing pulses so they are again substantially centered at the desired crossover point of the carrier signal.

Obviously the changes in phase for a particular direction of departure of phase of the carrier is different for the odd numbered crossovers than it is for the even numbered crossovers. Therefore, the servo system will function to select only either the odd or the even crossovers according to the wiring of the amplifier circuit. An "odd-even" switch (not shown) is included for changing polarity according to the desired selection.

The envelope detector samples voltage at the crests of successive half-cycles as shown in FIG. 6. As previously described, the full voltage that is developed across the secondary winding of the radio-frequency transformer 19 is applied to the input of the diode bridge 11, and a predetermined amount less than the full voltage is applied through the arm of potentiometer 22 to the input of the diode bridge 12. In order that the inputs to the diode bridges are equal, the arm of potentiometer 22 is adjusted to decrease the voltage that is applied to the diode bridge 12 by the amount that is equivalent to the increase in voltage of the second half-cycle that is sampled for each pulse. This adjustment provides for a zero meter output when the phase shifter 29 is positioned so that the strobing voltage is applied at a selected crossover. Since the ratio of the difference in amplitude of the pulses to the overall amplitude of the pulses continually changes during the first part of the pulses, the setting of potentiometer 22 corresponds to a particular crossover when the output of the detector system is zero. As described in detail above, a strobing pulse is applied to the diode bridge 11 at the proper time to sample the crest of the half-cycle that precedes the selected crossover, and a strobing pulse is applied to the diode bridge 12 at the proper time to sample the crest of the half-cycle that succeeds the selected crossover.

Assume that the electronic reversing switch 15 is maintained operated in one state to provide at the inputs of the diode bridges 11 and 12 signal having the phase shown in the left waveform of FIG. 6A. Also, assume that the armature 53 is positioned as shown in FIG. 1 so that capacitor 24 is connected to receive the charge from the outputs of diode bridges 11 and 12. When the potentiometer 22 is properly adjusted to correspond to the selected crossover, the short pulses of charging current supplied from diode bridges 11 and 12 cancel so that no appreciable charge is accumulated upon capacitor 24. During the application of the first strobing pulse of a series to enable the diode bridge 11, the pulse of current supplied to the capacitor 24 tends to charge it positively. During the succeeding half-cycle, the crest is sampled through operation of the diode bridge 12 to tend to charge the capacitor 24 negatively. When the charging pulses are equal, they cancel and the voltage across capacitor 24 is zero.

Assume that the potentiometer 22 is adjusted for the sixth crossover while the phase shifter 29 is adjusted so that sampling is occurring about the fifth crossover, then the sampling time occurs when the ratio of the difference in peak amplitudes of the crests that are being sampled to the amplitude of the first crest of the waveform is different from that corresponding to the setting of the potentiometer 22. Usually the change in overall amplitude of the crests is more significant than the amount of change in the difference between the two crests being sampled in determining differences in the setting of potentiometer 22 for different sampling points. The setting of the potentiometer for obtaining zero output of the detector is not merely a function of the slope of the leading edge. Whereas slope is defined as the ratio of an increment of the leading edge to the time of the increment, the ratio as determined by adjustment of potentiometer 22 is the ratio of the increment of the amplitude to the overall amplitude of the waveform at the sampling point. When the crest voltages are sampled sequentially by diode bridge 11 and then by diode bridge 12 at a crossover that precedes the crossover for which potentiometer 22 is adjusted, the capacitor 24 accumulates a negative voltage that is applied through contacts of the chopper 16 to the input of the succeeding alternating-current amplifier. Contrarily, if the phase shifter 29 is adjusted so that the crest voltages are being sampled at a later period, such as the seventh crossover, the capacitor 24 accumulates a positive charge. As described above, a polarity reversing switch is required in the circuit preceding servo 30 to change between even and odd crossovers.

When the electronic reversing switch 15 is operated to apply the right waveform of FIG. 6A to the input of the diode bridges 11 and 12 and the armature 53 is connected to charging capacitor 25, voltages of opposite polarities from those applied to capacitor 24 are applied to capacitor 25 for corresponding displacements of the strobing pulses. When the sampling is at an earlier crossover, the voltage accumulated on capacitor 25 is positive. When the strobing pulses that are supplied to the cycle detector are centered on the desired crossover, the effect of the two pulses of current derived from sampling any pulse are canceled. The capacitors 24 and 25 are connected in series through resistors 54 and 55. The voltages of the capacitors are of such polarity that they are additive when they are caused by sampling at other than the preselected crossover. Offset voltages of the same polarity appear across capacitors 24 and 25 because of unbalance in diode bridges 11 and 12 caused by inherent differences in the diodes. These voltages, being of the same polarity, oppose each other in the series circuit for the input of the amplifier and are canceled.

The junction of the resistors 54 and 55 that are connected in series with the capacitors 24 and 25 is connected through contacts of the chopper 56 to the input of the alternating-current amplifier 57. The chopper 56 operates to provide a frequency at which the alternating-current amplifier 57 operates efficiently. The function of this chopper corresponds to that of chopper 46 in the output of the cycle detector. The output of the amplifier 57 is coupled through the transformer 58, the contacts of chopper 56, a low-pass filter comprising resistor 59 and capacitor 60, to the direct-current milliammeter 61 that functions as a wave shape indicator. The outside terminals of the secondary winding of the transformer 58 are connected to contacts of the chopper 16 so as to restore the sense of voltage in the same way that chopper 17 restored the sense of voltage for the cycle detector. The contacts of chopper 56, that are connected to the center tap of the secondary winding, rectify the voltage that has been converted to pulsating current at the input of the amplifier 57 by the operation of the chopper.

The oscilloscope 52 of the timing or long range navigation receiver of FIG. 1 is used in the following manner to adjust the potentiometer 22. Subsequently the wave shape meter 61 can be used alone to slew the receiver to the desired crossover according to the setting of potentiometer 22. A complete timing receiver has controls for shifting the phase, or slewing, the strobing pulses at various rates relative to the timing of the incoming pulses. For example, assume that the phase shifter 29 can be controlled manually while the position of the strobing pulses, relative to the incoming pulses, is determined by observing the image according to FIG. 4 on the oscilloscope 52. When the phase shifter is adjusted so that the strobe is near the desired crossover, the servo system 30 operates to center the strobing pulse upon the crossover. The potentiometer 22 is then adjusted until the pulse wave shape meter 61 reads zero. The meter 61 may be of the type that displays zero at center scale. Usually, a receiver has other voltage dividers in addition to the one comprising resistor 21 and potentiometer 22 to be selectively connected across the secondary winding of transformer 19 by a selector switch. By operating the switch to select different voltage dividers, the respective potentiometers can be adjusted for the different desired crossovers that are being observed on the oscilloscope 52.

During reception of timing signals while noise interference is severe, the meter alone must be relied upon for tuning. After the potentiometer 22 has been adjusted for a particular crossover as observed upon the oscilloscope, the receiver may be slewed until the desired crossover is selected as indicated by a zero reading on the meter 61. At a stationary receiving station, reception can ordinarily be expected to be good enough at times, even over long distances, to adjust the potentiometer 22 by observation of the waveform on oscilloscope 52. When the mobility of a receiving station or its remoteness prevents use of the oscilloscope for tuning, the potentiometer 22 can be adjusted according to predicted wave shapes as determined by the distance and the proportional amounts of land and sea between the transmitting stations and the receiving station.

When the receiver is to be operated in locations where interfering signals have about the same frequency as the frequency of the signal that is to be received, an inhibit circuit can be incorporated in the receiver to balance out the interfering carrier. A suitable inhibit circuit is described in the patent application, Ser. No. 247,906, "Blanking Circuit Synchronized With Code For Balancing Detector Interference," filed in the United States Patent Office on Dec. 28, 1962 by Paul M. Cunningham. The inhibit circuit can be connected between the strobe forming circuit 37 and the delay line 14. The control circuits of the inhibit circuit can be connected to the pulse counter 32. As described in the patent application cited above, the control voltages derived from the pulse counter determine which strobing pulses are to be applied to the detectors. The inhibition of selected strobing pulses prevents detector output when incoming pulses of one phase are received in excess of the number of pulses of the other phase within any group. The outputs of the detectors appear as though all incoming groups were balanced. When the incoming groups are balanced such that the number of "+" pulses equals the number of "—" pulses, assuming that the interfering carrier does not change phase in synchronism with the changes in phase of the incoming pulses, the pulses of voltage of one polarity developed in the detector are balanced out by an equal number of pulses of the opposite polarity.

Although the detector system of this invention that provides direct strobing of the radio-frequency carrier has been shown only in a single channel timing receiver, the system may be adapted to multi-channel long-range navigation receivers and to any measuring system that is to measure the wave shape at carrier frequencies for which strobing circuits may be designed.

What is claimed is:

1. A detector for measuring the wave shape of incoming recurring pulses of radio-frequency carrier comprising, first and second synchronous detectors, each of said detectors having a signal input and a strobe input, receiving means for applying said incoming pulses to said signal inputs, pulse forming means having first and second outputs, said pulse forming means generating a first strobing pulse for application to its first output and a second strobing pulse for application to its second output, the width of each of said strobing pulses being less than one-half period of one cycle of said radio-frequency carrier, means for synchronizing the formation of said first and second strobing pulses with said incoming pulses so that said first and second strobing pulses occur simultaneously with respective selected successive half-cycles of said radio-frequency carrier of each of said incoming pulses, said first and said second outputs of said pulse forming means being connected to said strobe inputs of said first and said second detectors respectively, each of said detectors developing an output voltage proportional to the amplitude of that half cycle of said radio-frequency carrier which is applied simultaneously with the respective one of said strobing pulses applied thereto, and measuring means connected to said outputs of said detectors for comparing the amplitudes of said successive half-cycles of said radio frequency carrier.

2. In a timing receiver, first, second, and third synchronous detectors each having a signal input and a strobe input, radio-frequency receiving means for applying received repetitious groups of predetermined numbers of pulsed radio-frequency carrier signals to the input of each of said detectors, a frequency standard, phase correction means operative in response to change in output of said first detector to change the phase of the signal at the output of said frequency standard, a strobe forming circuit connected to the output of said frequency standard, said strobe forming circuit responsive to the application of said phase controlled signal from said frequency standard to form a strobe pulse for each pulse of said received groups, a delay line having an input and first and second outputs, said input of said delay line being connected to said strobe forming circuit, said delay line delaying each of said strobe pulses for said first output thereof for a period less than one-fourth of the period of said radio-frequency carrier signal and delaying said pulses for said second output thereof for a period greater than one-fourth but less than one-half of said period of said radio-frequency carrier, said strobe input of said first detector being connected to said first output of said delay line, said first detector sampling each of said repetitious groups during a time period less than the period of said radio-frequency carrier signal at a selected crossover of said carrier signal, said phase correcting means operating in response to application of voltage from said first detector to maintain the sampling period of said first detector centered upon said selected crossover, the strobe input of said second detector being connected to said strobe forming circuit, said second detector sampling said radio-frequency carrier prior to said selected crossover, the strobe input of said third detector being connected to said second output of said delay line, said third detector sampling said radio-frequency carrier subsequent to said selected crossover, the outputs of said second and third detectors being connected to a voltage-comparison circuit, and indicator means connected to the output of said voltage-comparison circuit for indicating the difference of the output voltages of said second and third detectors.

3. A timing receiver having synchronous detectors as claimed in claim 2 in which said radio-frequency receiving means includes an electronic phase changing switch, said received pulses of radio-frequency carrier being coded with two types of pulses that are distinguished by 180 degree phase reversals of radio-frequency carrier, a pulse phase coding circuit responsive to application of said phase controlled signal from said frequency standard to reproduce pulses with the phasing and timing of said received pulsed radio-frequency carrier signals, said electronic phase changing switch being connected to said pulse phase coding circuit, said electronic phase changing switch reverse the phase of only a selected one of said types of said received pulses in response to said reproduced pulses from said phase coding circuit being applied thereto, whereby—all of said received pulses are of a like phase as applied to said signal inputs of said detector, timing means connected to said pulse phase coding circuit for periodically reversing the phase of all of said reproduced pulses, whereby said electronic phase changing switch reverses simultaneously the phase of said received pulses and the phase of said received pulses are recoded into alternate series of pulses distinguished by phase reversal at intervals determined by operation of said timing means, a chopper in the output circuit of each of said detectors, said choppers being connected to said timing means and being driven by said timing means in synchronism with changes in said phase coding at said signal inputs of said detectors and rectifying the output of said detectors said rectified detector outputs being applied to said phase correcting means and to said indicator means respectively.

References Cited

UNITED STATES PATENTS

| | | | |
|---|---|---|---|
| 3,101,448 | 8/1963 | Costas | 329—50 |
| 3,162,773 | 12/1964 | Jansons | 328—133 |
| 3,209,270 | 9/1965 | De Vries | 329—50 |

JOHN W. CALDWELL, *Acting Primary Examiner.*

S. J. GLASSMAN, J. T. STRATMAN, *Assistant Examiners.*